Figure 3:
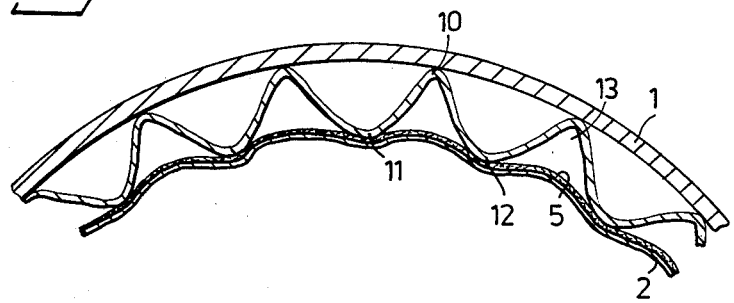

United States Patent [19]
Alskog

[11] 4,145,196
[45] Mar. 20, 1979

[54] FILTER ELEMENT

[75] Inventor: Magnus Alskog, Skara, Sweden

[73] Assignee: AB Lectrostatic, Skara, Sweden

[21] Appl. No.: 835,754

[22] Filed: Sep. 22, 1977

[30] Foreign Application Priority Data
Oct. 8, 1976 [SE] Sweden .................................. 7611182

[51] Int. Cl.² .............................................. B01D 46/02
[52] U.S. Cl. ...................................... 55/380; 210/315;
210/356; 210/489
[58] Field of Search ........................... 55/378, 379, 380;
210/356, 315, 484, 486, 487, 498, 489

[56] References Cited
U.S. PATENT DOCUMENTS

| 1,148,237 | 7/1915 | Kneuper | 210/356 |
| 2,514,280 | 7/1950 | Hammell | 55/380 |
| 2,800,194 | 7/1957 | Peek | 55/380 |
| 3,326,382 | 6/1967 | Bozek et al. | 210/356 |
| 3,364,663 | 1/1968 | Lagerstrom | 55/380 |

FOREIGN PATENT DOCUMENTS 104842  3/1917  United Kingdom ...................... 55/380

Primary Examiner—Bernard Nozick
Attorney, Agent, or Firm—Sughrue, Rothwell, Mion, Zinn and Macpeak

[57] ABSTRACT

A filter element having a bag of filter medium surrounded by an elastic net hose with a corrugated wall interposed therebetween.

3 Claims, 5 Drawing Figures

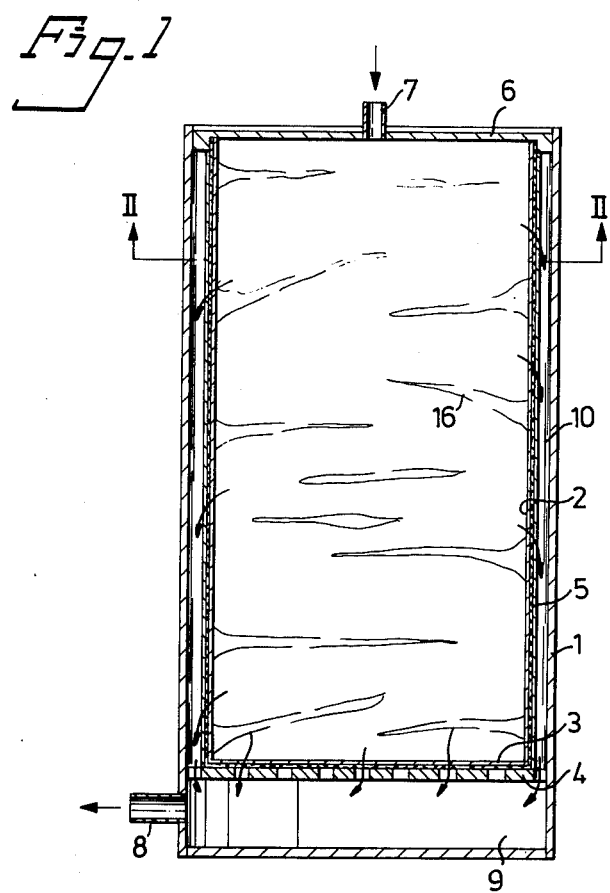
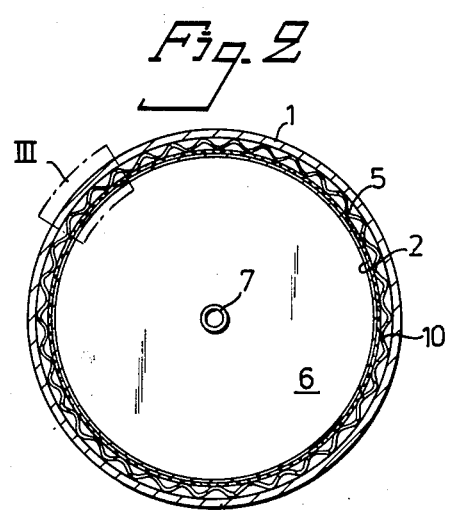

FILTER ELEMENT

The invention relates to a filter element particularly intended to operate at high, pulsating pressure loads and comprising a bag or hose-like filter medium made of a fibrous material, to the interior of which contaminated air is passed via an inlet and the outer surface of which abuts a tubular wall which permits purified air to depart through the filter medium.

Such filter elements, which are used in industrial vacuum cleaners and in hose filters, are subjected to very high strain owing to the differences in pressure which occur between the inner wall of the filter element and the outer wall thereof and due to the pulsations caused by these pressure differentials.

In the case of vacuum cleaners, an attempt has been made to solve this problem by bringing the bag-like filter element, which is normally made of paper, into contact with a surrounding wall made of perforated sheet metal or the like.

Even though a certain improvement has been obtained, insomuch as bursting of the bag can be prevented, there occurs a great deal of wear between the wall and the filter element, which results in small holes and cracks, the presence of such small holes and cracks greatly reducing the cleaning efficiency of the apparatus. Since the pressure differentials normally increase with increasing quantities of dust and other impurities taken up by the filter medium, it is necessary to change the filter medium relatively often in order to avoid interruptions.

In the case of so-called hose filters, in which the filter medium comprises a hose-like bag open at both ends, which beg normally comprises a textile material, the pulsating load to which the filter is subjected causes still greater wear.

Consequently it is the principle object of this invention to provide a filter element of the type mentioned in the introduction, with which the risk of bursting or wear is at least substantially eliminated.

A further object is to provide a filter element which can be loaded with impurities to a much greater extent than was previously possible with known filter elements.

These objects are realised by means of the invention as it is defined in the claims and described hereinafter with reference to the accompanying drawing.

Figure 4:
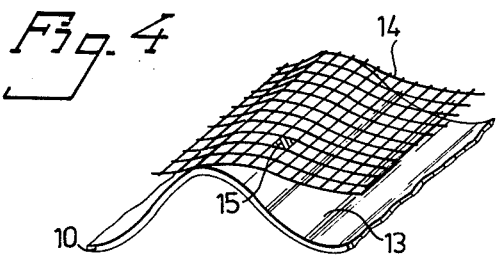
Figure 5:
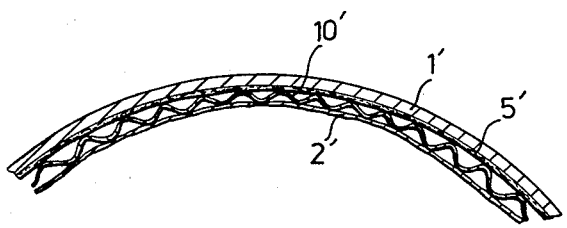

FIG. 1 is a simplified vertical sectional view through the important elements of an industrial vacuum cleaner provided with a filter according to the invention, FIG. 2 is a sectional view taken along the line II—II in FIG. 1, FIG. 3 is an enlarged view of the area III shown in FIG. 2, FIG. 4 illustrates a detail of pressured-absorbing means and, FIG. 5 is a sectional view similar to that of FIG. 3 but relating to a modified arrangement.

In the drawing there is shown a closed container or housing 1 containing a filter medium 2 manufactured from a fibrous, air-permeable material, such as paper or textile material. In the illustrated embodiment the container 1 has a circular cross-sectional area, although it will be understood that said container may have any suitable cross-sectional shape. This filter means of the illustrated embodiment comprises a closed container having a bottom 3. The bottom 3 abuts a perforated bottom 4 of the housing 1. The closed container is placed in a net-like sack 5 the upper edge of which, similar to the upper edge of the filter means 2, is securely and sealingly connected to plate 6 having an inlet opening 7 for contaminated air. As indicated by arrows, the contaminated air is sucked into the filter means 2 and, subsequent to being freed from dust and other particles, departs through one or more outlets, for example the outlet 8. The suction fan, not shown, can be connected to the outlet 8 or may be located in a space 9 in the housing 1 beneath the plate 4.

Between the housing 1 and the described filter element there is provided a wall 10 which permits purified air to flow out through the filter means and out of the outlet 8. As illustrated in the drawing, this wall suitably comprises a corrugated cylinder made, for example, of metal or a rigid plastics material, the corrugations of said cylinder extending from the inlet end of the filter means down to the plate 4. The cross-sectional area of the filter means 1 in each plane parallel to the bottom 4 of the illustrated embodiment is greater than the corresponding area of the sack 5, and consequently the wall of the filter means will be urged towards the wall of the sack when a higher pressure prevails in the interior of the filter means than on the outside thereof.

The sack 5, which preferably comprises a network of a somewhat stretchable material has in turn a larger cross-sectional area than the area defined by a circle through the crests of the the corrugations, for example the crests 11 and 12, and will, therefore, flex inwardly somewhat, as shown in FIG. 3, between two mutually adjacent crests when the filter means is loaded. Pressure pulsations occuring in the interior of the filter means caused by the fan impellor and having a high frequency, or caused by the movement of a suction nozzle over a surface to be cleaned and having a low frequency, will therefore only cause slight force varations in the area of the filter means 2 lying above a valley 13 in the corrugated wall, these variations in pressure being taken up by the threads 14 of the sack, as shown in FIG. 4. The threads 14 of the network, which threads are preferably somewhat elastic, delimit small areas, for example the area 15 shown in hatched lines, and corresponding areas of the filter means will be subjected to insignificant loads, which excludes the risk of bursting. Each mesh 15 of the net preferably has a largest dimension which is smaller than the perpendicular distance between two mutually adjacent crests 11, 12. Since the periphery of the sack is smaller than the periphery of the filter means and is at least sufficiently elastic to permit it to flex inwardly, when loaded, into the valleys or grooves 13, when the filter means is subjected to a rapid increase in pressure a resilient force will act against the wall of the filter means, thereby eliminating the risk of wear. The amount of wear will be minimum since the wall of the filter medium and the wall of the sack execute practically the same expansion and contraction movements.

Preferably the filter means 2 has a length which is much greater than the length of the pressure-absorbing sack 5, whereby the filter means will form a large number of folds 16 (FIG. 1), which provide an increased through-flow area and therewith a smaller load of dust etc. per unit of surface area at a given size for the sack 5. The hose-like pressure-absorbing member 5 is suitably manufactured from a flexible, and optionally an elastic plastics material or optionally from metal wire.

FIG. 5 is a sectional view similar to that of FIG. 3 but illustrating a modified filter element, particularly intended for filter bags of relatively small volume, for example volumes of 20 to 50 liters. In this embodiment, the bag lies directly against the wall of the housing 1' and encloses a corrugated cylinder 10' made of corrugated cardboard or a slightly resilient plastics material. Arranged in the interior space of the cylinder as a bag 2' or the like made of a fibrous, air-permeable material, for example paper or a textile material. The length of the bag 2' exceeds the length of the net-like sack and has a circumference which is larger than the circumference of said sack. The function of this filter element is the same as that of the filter element first described.

Even though the invention has been described with reference to a filter element of the closed-bag type it can also be used with so-called hose filters. The described air-conducting wall 10, 10' may comprise a perforated cylinder of metal or plastics material or some other suitable material, although the described corrugated wall is to be preferred and can have the form of a lose insert of metal, plastics or optionally fibrous material. The wall 10, 10' can be excluded, since the filter bag or filter hose 2, 2' forms a large number of folds on the outer surface thereof, these folds permitted purified air to pass out through the wall of the filter means, although the provision of flow passages by means of the wall 10, 10' is to be preferred to the highest possible efficiency is to be obtained.

What we claim is:

1. In a filter element intended to operate at high, pulsating pressure and including a hose-like filter means made of fibrous material, an inlet to the interior for supplying contaminated air and a wall through which purified air departs, the filter means surrounded by a net-like, elastic hose-like member, the improvement comprising; the length of the filter means and the circumference of said means in the expanded state of said means exceed the length and circumference of the net-like hose-like member, a corrugated wall interposed between said filter member and said hose-like member, the filter means arranged in folds abutting the corrugated wall, said corrugations extending in the longitudinal direction of the filter means, and said filter means held compressed by said hose-like member.

2. A filter element according to claim 1, wherein the filter means has a bottom remote from said inlet; and the pressure-absorbing hose-like member has a bottom abutting said bottom of said filter means.

3. A filter element as claimed in claim 1, wherein the inner surface of the net-like, hose-like member abuts said corrugated wall.

* * * * *